United States Patent [19]

Romano

[11] Patent Number: 4,948,045

[45] Date of Patent: Aug. 14, 1990

[54] HEATING AND AIRCONDITIONING CONTROL SYSTEM

[75] Inventor: Harry A. Romano, Naples, Fla.

[73] Assignees: Robert J. Karr; J. Harold Martin, both of Marco Island, Fla.; part interest to each

[21] Appl. No.: 296,703

[22] Filed: Jan. 13, 1989

[51] Int. Cl.$^5$ ............................................. G05D 23/00
[52] U.S. Cl. ..................................... 236/51; 236/1 R
[58] Field of Search ......................... 236/1 R, 51, 47

[56] References Cited

U.S. PATENT DOCUMENTS

| | | | |
|---|---|---|---|
| 3,653,589 | 4/1972 | McGrath | 236/49.3 |
| 3,729,735 | 4/1973 | Dageford | 236/1 R X |
| 4,391,406 | 7/1983 | Fried | 236/47 |
| 4,391,913 | 7/1983 | Keldmann | 236/51 X |
| 4,462,540 | 7/1984 | Dytch | 236/47 |

FOREIGN PATENT DOCUMENTS 3441695  5/1986  Fed. Rep. of Germany ..... 236/1 R

Primary Examiner—William E. Wayner
Attorney, Agent, or Firm—William F. Hamrock

[57] ABSTRACT

The invention is directed to an electronic control apparatus which will shut off a heating or airconditioning system when a door or window is opened. The apparatus provides a magnetic switch and transmitter attached to a door or window which will emit an infrared or sonic signal when the door or window is opened. The signal is received by an infrared or sonic receiving means which shuts off the thermostat from operating for at least three minutes to prevent damage to the heating or cooling system, in particular the compressor.

10 Claims, 3 Drawing Sheets

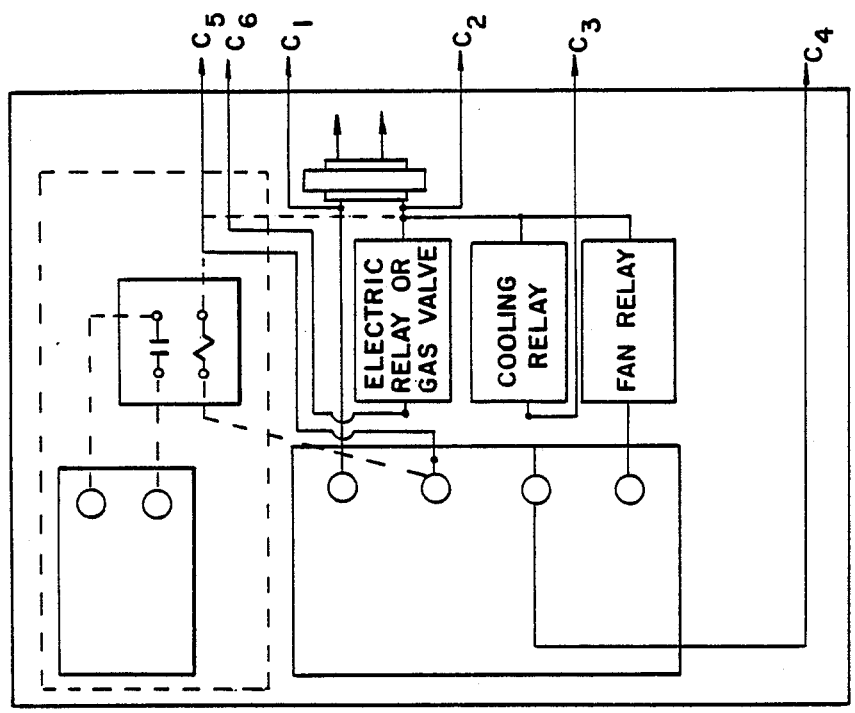
FIG. 2.
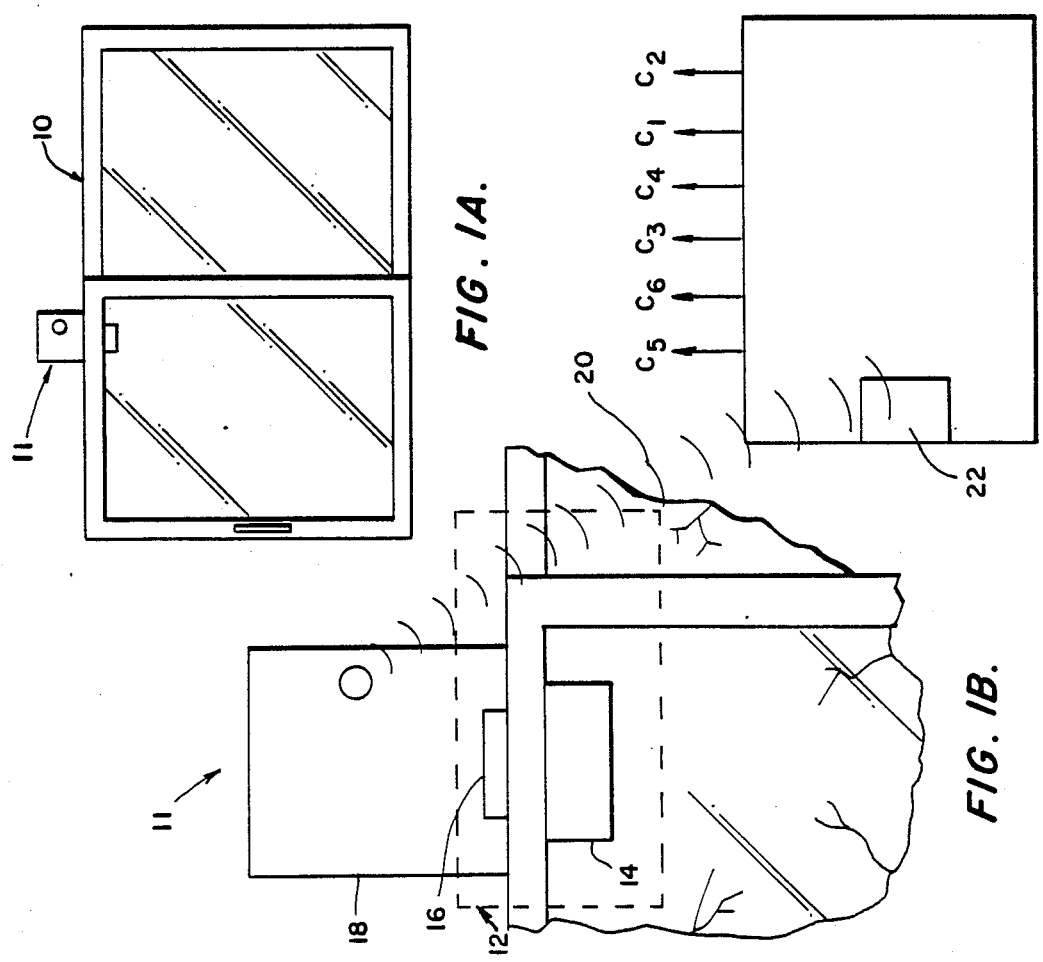
FIG. 1A.
FIG. 1B.
FIG. 1C.

HEATING AND AIRCONDITIONING CONTROL SYSTEM

BACKGROUND OF THE INVENTION

1. Field of the Invention

My invention relates to electronic control apparatus which will shut off a heating or airconditioning system when a door or window is left open. The system can be used in motels, hotels, homes and in most places where the heating or cooling is controlled by a thermostat.

2. Description of the Prior Art

With the ever increasing cost of fuel and electricity, the operation of heating and cooling systems has become very expensive. This is particularly a problem for motels, hotels, buildings and residences where in many instances there is no direct control over the occupants of the establishment. As often happens, doors and windows are left wide open, allowing heat or cooling air to escape while the heating or airconditioning system is continuously working to keep the room temperature constant. Such wastefulness of energy results in a considerable increase in the fuel and electric bills.

To the best of my knowledge, there is no remote electronic control apparatus which will shut off the heating or airconditioning system in an area when a door or window is left open. It is known that some burglar alarm systems are attached to door or windows to detect displacement thereof and to sound an alarm accordingly. However, I have no knowledge of a remote electronic control system which controls the heating and cooling of an area by shutting off a thermostat when a door or window is left open.

SUMMARY OF THE INVENTION

It is an object of the present invention to provide a sensing apparatus to control the loss of heat or airconditioning through open doors or windows.

It is a further object to provide a cordless, remote controlled apparatus which is relatively inexpensive and readily attached to doors or windows and to a thermostat and meets all building code requirements.

It is another object to provide an apparatus which is easy to operate and will not short-cycle heating or airconditioning system due to frequently opening and closing doors or windows.

The above objects are met with the electronic control system of the present invention which provides a door or window sensing device which transmits an electronic signal to a receiver which then turns off a thermostat upon receipt of the signal.

The sensing device includes a transmitter and switch attached to the door frame or window frame and a magnet attached to the door or window. When the door or window is closed, the switch is controlled by the magnet and turns off the transmitter. When the door or window is opened the magnet is pushed out of range of the switch, causing the transmitter to be turned on. A high pitched sonic sound or infrared beam is transmitted to the receiver which activates a timer-relay drive circuit and turns off the thermostat for a period of time usually at least three minutes. By having the thermostat turned off for this period of time, it prevents short-cycling of the compressor of the airconditioner by frequent opening and closing the doors or windows, thus saving fuel and electricity due to the shut-down of the compressor when doors or windows are opened.

BRIEF DESCRIPTION OF THE DRAWINGS

In the drawings which illustrate embodiments of the invention:

FIG. 1A is a view of the device attached to a sliding glass door.

FIG. 1B is an expanded view of the device of FIG. 1A sending light or sound beams to a receiver.

FIG. 1C is an illustrative view of a receiver receiving said beams.

FIG. 2 is a schematic circuit diagram of a standard thermostat.

DESCRIPTION OF THE PREFERRED EMBODIMENT

Figure 3:
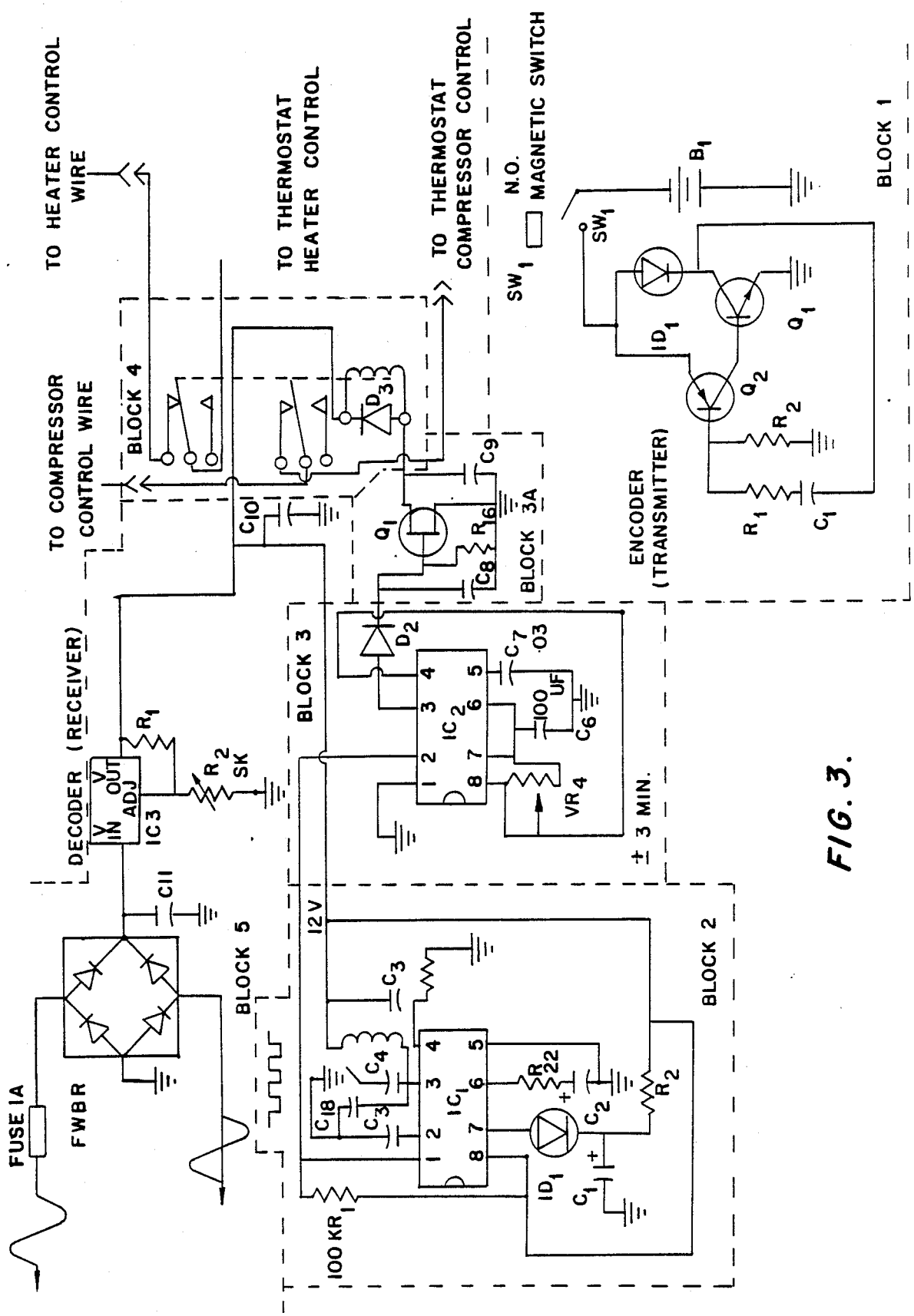
FIG. 3 is a schematic diagam of an infrared activated embodiment of the invention.

FIGS. 1A, 1B and 1C are an overall view of the invention. As illustrated in these figures, sliding glass door 10 is shown illustrating the device 11 attached thereto. FIG.1B illustrates magnetic switch 12 including magnet 14 fastened to the door and switch 16 in transmitter 18 fastened to the frame. When the door is closed as illustrated, normally open magnetic switch 16 is opened by magnet 14 which prevents transmitter 18 from functioning. When the door is opened, magnet 14 is moved out of range of switch 16 which then turns on transmitter 18 which emits an infrared or high-pitched sonic sound signal 20. The signal is picked up by receiver 22 which then functions to disconnect cooling relay wired $C_3$ and $C_4$ from a standard thermostat and heating relay wires $C_5$ and $C_6$ from the thermostat shown in the schematic circuit diagram of FIG. 2.

FIG. 3 is a schematic circuit diagram of a preferred infrared activated embodiment of the invention. The diagram of blocks 1–5 illustrate the following:

Block 1 is the infrared transmitter;
Block 2 is the infrared receiver;
Block 3 is the timer and relay drive circuit;
Block 4 is the relay;
Block 5 is the power supply.

The operation in accordance with the infrared activated system of FIG. 3 is initiated by the infrared transmitter circuit of Block 1 which is powered by the 3-volt battery B1. When the door is opened, the magnet moves away from switch SW1 causing the open switch SW1 to close and turn on the transmitter. This allows current to flow into the circuit causing a pulsating current through ID1 which emits the infrared signal. $Q_1$ and $Q_2$ with $R_1$ and $C_1$ form a voltage controlled oscillator circuit which produces pulses through emitting diode $ID_1$ causing it to emit infrared pulses. $R_1$ and $C_1$ control the frequency of the oscillator. $R_2$ is a bias control resistor.

In Block 2, infrared diode $ID_1$ receives the infrared signal being generated by the Block 1 transmitter. The signal passes through pin 7 into integrated circuit $IC_1$, which is a television infrared integrated preamplifier chip, where it is amplified, detected, reshaped and filtered to produce a negative pulse train output through pin 1. $R_1$ is a pull-up resistor for the output of $IC_1$. $C_4$ and canned coil $L_1$ determine the receiver and converter frequency of the infrared signals. $R_{22}$ and $C_2$ form a timing circuit to determine the duration of the output pulses. $C_1$ and $R_2$ determine the frequency of the infrared signals and form a filter circuit for $ID_1$.

Block 3 is a timer latch circuit which is set for 3 minutes. Block 3 is activated by the negative pulse train from Block 2. The negative pulses enter Block 3 to activate timer latch circuit $IC_2$ which causes pin 3 to go high for 3 minutes and activate the transistor $Q_1$ in Block 3A.

In Block 3, $C_6$ and $VR_4$ form the basic timer circuit for $IC_2$ which has a threshold detector built in and deactivates $IC_2$ when the voltage of pins 6 and 7 reach a certain level. $D_2$ is a blocking diode which prevents voltage from being fed back into $IC_2$. $C_7$ is a stabilization capacitor which prevents $IC_2$ from false triggering.

Block 3A is a relay driver and slight delay circuit. $Q_1$ is a Field Effect Transistor (FET) which having been activated causes current to flow which then activates Block 4.

In Block 3A, $R_{16} C_8$ form a one-second timing circuit which keeps $Q_1$ activated for about one second after pin 3 of $IC_2$ goes low and acts as a buffer from $IC_2$ to the relay of Block 4. $C_9$ is a transient subpressor which absorbs transients from the relay coil in Block 4. Other transistors are also operable within the system. Likewise, IC1 and IC2 can be interchanged with equivalent standard operating equipment.

Block 3 and Block 3A in combination cause current to flow to energize the relay in Block 4 for at least three minutes after receiving a pulse from Block 2. What this means is that the relay in Block 4 which acts as the switch which operates the thermostat will turn off the thermostat for at least three minutes once a pulse is emitted by Block 2. The advantages of the time delay control of the unit are many but in particular it prevents damage to the heating and cooling systems such as short cycling of the compressor due to frequently opening and closing the doors or windows.

Block 4 is a double-pull, double-throw DPDT relay. When energized, it disconnects the wires going to the thermostat thereby turning off the compressor relay and the heater. $D_3$ is a transient diode protector which protects $Q_1$.

Block 5 is a schematic of the regulated power supply of the receiver. It is a variable power supply which accepts AC and DC input from 6 to 40 volts. It includes a standard full wave bridge rectifier FWBR, a standard voltage regulator $IC_3$ and filter capacitors $C_{10}$ and $C_{11}$.

In operation of the Block 5 circuit, an analog signal such as AC voltage of 6 to 40 volts is supplied to the FWBR and converted to DC voltage which can be varied by $R_2$ and $R_1$. Preferably, the circuit operates at 12 DC volts but can operate at from 3 to 18 DC volts. The converted DC pulses from the FWBR are filtered by $C_{11}$ and fed into voltage regulator $IC_3$ which also adjusts the output to a steady voltage and feeds the rest of the circuit. The output of $IC_3$ is filtered by $C_{10}$ thus producing useable DC pulses to operate the rest of the system.

The above description of Blocks 1-5 illustrates what happens when the door is opened and thermostat is turned off in the infrared system. The following is a description of what happens when the door is closed to put the heating or cooling system back in operation.

When the door is closed, the magnet is aligned with switch SW1 causing it to open, resulting in transmitter Block 1 to stop transmitting and receiver Block 2 to stop receiving and sending out pulses. Thereby, Block 3 and Block 3A are not activated, resulting in the de-energizing of Block 4. After Block 4 has been de-energized, generally about at least three minutes, the thermostat wiring in FIG. 2 is reattached. $C_4$ will connect to $C_3$ cooling relay in the airconditioning and $C_6$ will connect to $C_5$ heating valve coil for the heating system. At this time the system is back to normal operation.

Figure 4:
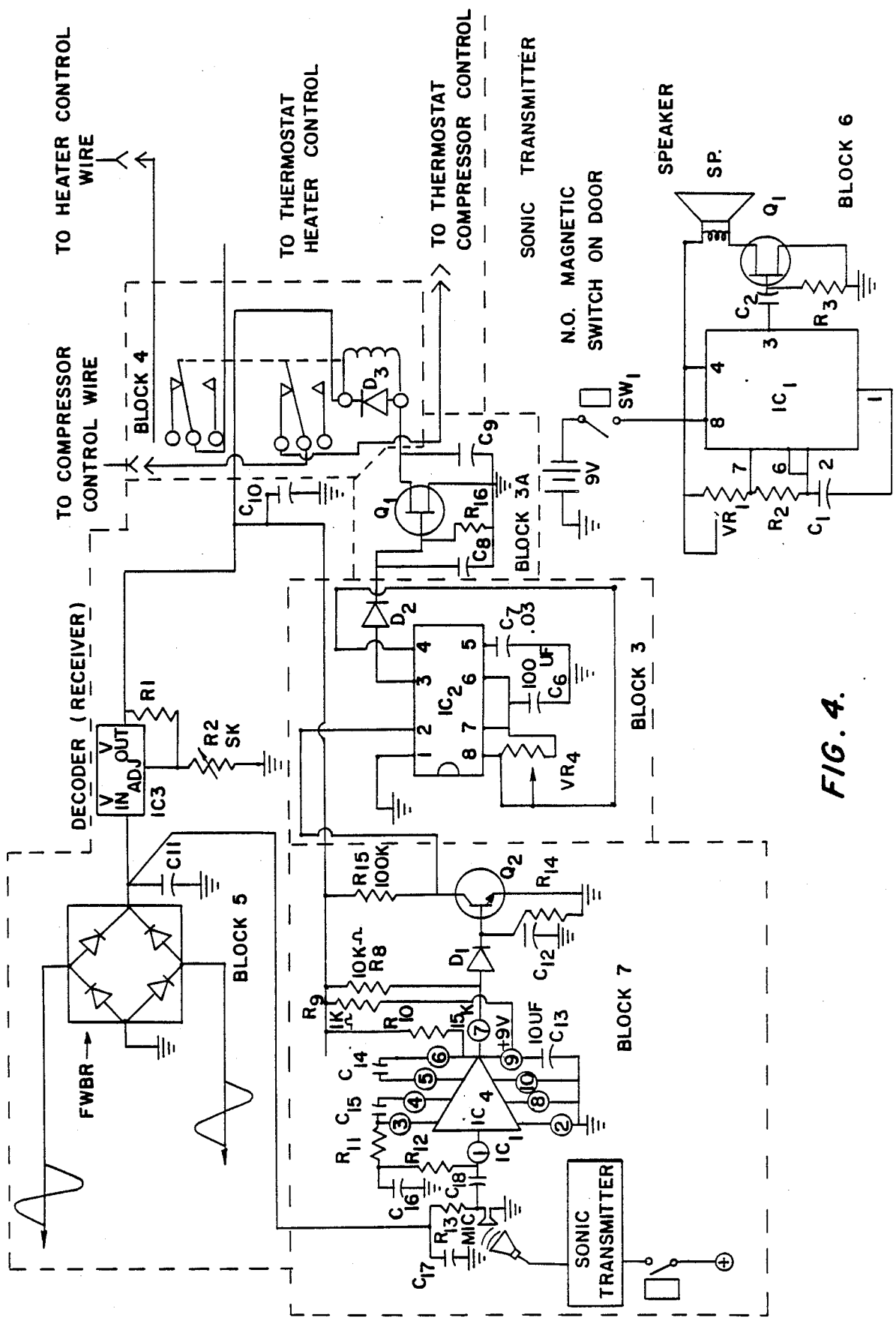
FIG. 4 is a schematic circuit diagram of a sonic activated embodiment of the invention.

Turning now to FIG. 4, it illustrates a schematic circuit diagram of the high-pitched sonic sound-activated preferred embodiment of the invention. FIG. 4 diagram is similar to FIG. 3 infrared diagram except for Block 6 sonic transmitter which replaces Block 1 infrared transmitter and Block 7 sonic receiver which replaces Block 2 infrared receiver.

The sonic unit operates at 20 kilo khz a high-pitched sonic sound wave as opposed to a RF (radio frequency) wave.

The operation of the high-pitched sonic sound activated system is initiated in Block 6 when the magnet is moved outside the range of switch SW 1. This closes the switch SW 1 and energizes oscillator $IC_1$ which produces a sonic signal fed into basic amplifier $Q_1$. The sonic signals are amplified in $Q_1$ and fed into sonic speaker SP1 such as a sonic transducer, preferably a Piezo electric speaker.

In Block 6 sonic transmitter, $VR_1$, $R_2$ and $C_1$ form a RC circuit which determines the frequency of the sonic transmitter. $R_3$ is a bias resistor. $Q_1$ is a FET which can be substituted with any high gain transistor.

The transmitted sonic sound waves from Block 6 are received by Block 7 sonic receiver. The sound is detected by microphone and amplified and filtered by ultrasensitive audio amplifier $IC_4$. The output of $IC_4$ is an AC signal which is fed into the input of rectifier diode $D_1$ where it is convered to positive pulses. Said pulses bias general purpose transistor $Q_2$ causing the line going to pin 2 of $IC_2$, Block 3, to go low, thereby activating $IC_2$.

FIG. 4 illustrates that the sonic sound wave signal emitted from Block 6 transmitter having been amplified, detected and inverted in turn activates Blocks 3 and 3A and energize Block 4 as described above in discussion of FIG. 3. Likewise, the airconditioning and heating systems are put back in operation in the same manner as described for the infrared activated circuit of FIG. 3.

The parts lists of the preferred embodiments are:

| INFRARED TRANSMITTER | |
|---|---|
| RESISTORS | SEMI-CONDUCTORS |
| R1 = 10 K | Q1 = Gen Purpose NPN |
| R2 = 1 MEG | Q2 = Gen Purpose PND |
| CAPACITORS | SWITCH |
| C1 = .03 | SW1 = N.O. Magnetic Switch |
| DIODES | BATTERY |
| D1 = high power infrared SEP 8703-001 | 2-1.5 V |
| INFRARED RECEIVERS | |
| RESISTORS | DIODES |
| R1 = 100 K | ID1 = 3033 |
| R2 = 1 K· | D2 = ECG 125 |
| R3 = 150 K | D3 = ECG 125 |
| VR4 = 1 Meg | FWBR 1 |
| R16 = 1 Meg | |
| CAPACITORS | INDUCTORS (coil) |
| C1 = 10 UF radial | L1 = 5.0 MH TOKO |
| C2 = 4.7 UF 25 V | |
| C3 = 10 UF 25 V | SEMI-CONDUCTORS |
| C4 = .003 ceramic | IC1 = infrared receiver chip |
| C5 = .03 ceramic | Q1 = fet transistor |
| C6 = 100 UF electrolytic 25 V | Q2 = fet transistor |
| C7 = .03 UF ceramic | FWBR = 100 V 1 A |
| C8 = 1 UF 25 V | IC2 = timer circuit chip |

-continued

| | |
|---|---|
| C9 = .1 UF ceramic | IC3 = regulator |
| C10 = 220 UF 25 V | |
| C11 = 220 UF 50 V | |
| C18 = .1 UF 100 V | |
| RELAY | SWITCH |
| 12 V relay | N.O. Magnetic Switch |
| DPDT | |

SONIC TRANSMITTER

| RESISTORS | SEMI-CONDUCTOR |
|---|---|
| VR1 = 1 MEG | Q1 = BUZ 71 |
| R2 = 4.7 K | |
| R3 = 10. K | SPEAKER |
| CAPACITORS | Sp. Piezo electric horn |
| C1 = .01 UF | SWITCH |
| C2 = .1 UF | N.O. Magnetic Switch |
| | BATTERY |
| | 9 V Alkaline |

SONIC RECEIVER

| RESISTORS | DIODES |
|---|---|
| VR4 = 1 MEG | D1 = ECG 125 |
| R8 = 10 K | D2 = ECG 125 |
| R9 = 1 K | D3 = ECG 125 |
| R10 = 15 K | SEMI-CONDUCTORS |
| R11 = 150 K | IC1 = ECG 785 |
| R12 = 33 K | IC2 = NE 555 |
| R13 = 100 K | Q1 = BUZ 71 |
| R14 = 100 K | Q2 = BUZ 71 |
| R15 = 100 K | Q3 = 2N 222 |
| R16 = 1 M | FWBR = 100 V 1 A |
| CAPACITORS | MICROPHONE |
| C6 = 100 UF electrolytic 25 V | SWITCH |
| C7 = .03 UF ceramic | N.O. Magnetic Switch |
| C8 = 1 UF 25 V | |
| C9 = .1 UF ceramic | |
| C10 = 100 UF 50 V | RELAY |
| C11 = 220 UF 50 V | IDEC = 14 12 V |
| C12 = 10 UF 25 V | DPDT |
| C13 = 10 UF 25 V | |
| C14 = .002 ceramic | |
| C15 = .003 ceramic | |
| C16 = .02 ceramic | |
| C17 = .01 ceramic | |
| C18 = 4700PF | |

Further, it will be apparent to those skilled in the art from the foregoing description and accompanying drawings that additional modifications and/or changes of the disclosed embodiments may be made without departure from the invention. Accordingly, it is expressly intended that the foregoing description and drawings are illustrative of preferred embodiments only, not limiting, and that the true spirit and the scope of the present invention be determined by reference to the appended claims.

What is claimed is:

1. A heating and airconditioning remote control device comprising an infrared or sonic transmitting means coupled to a door or window whereby said means emits an infrared or sonic signal when said foor or window is open, an infrared or sonic receiving means coupled to a relay means whereby said receiving means receives said signal and energizes said relay means, said relay means coupled to a thermostat which controls the operation of a heating and/or airconditioning system, said relay disconnects said thermostat when energized, wherein said transmitting means includes a switch coupled to an infrared or sonic transmitter, attached to a door or window frame, and a magnet attached to a door or window aligned with said switch causing said switch to be open whenever said door or window is closed, upon opening said door or window, said magnet moves away from said switch causing said switch to close.

2. The device according to claim 1 wherein said receiving means is coupled to said relay means through a time delay means, said time delay means causing said relay to be energized for at least three minutes.

3. The device according to claim 2 wherein said time delay means includes a timer latch circuit and a relay driver and slight delay circuit.

4. The device according to claim 3 wherein said time delay means includes a timer latch circuit, a timing capacitor and resistor, a blocking diode, a stabilization capacitor, a field effect transistor and a capacitor and resistor.

5. The device according to claim 2 wherein said infrared transmitter includes a voltage controlled oscillator circuit and an infrared emitting diode.

6. The device according to claim 2 wherein said sonic transmitter includes a voltage controlled oscillator circuit and an amplifier and speaker.

7. The device according to claim 2 wherein said receiving means includes an infrared or sonic receiver and a power supply.

8. The device according to claim 7 wherein said infrared receiver includes a detector diode and a television infrared integrated preamplifier chip.

9. The device according to claim 7 wherein said sonic receiver includes a microphone, an audio amplifier, a rectifier diode and a transistor.

10. The device according to claim 7 wherein said power supply includes a full wave bridge rectifier, a voltage regulator and filter capacitors.

* * * * *